United States Patent
Palmer et al.

(10) Patent No.: US 7,397,962 B2
(45) Date of Patent: Jul. 8, 2008

(54) AUTOMATIC METHOD OF IDENTIFYING IMAGE SUBREGIONS FOR REUSE DURING DATASTREAM TRANSMISSION

(75) Inventors: Dwight Ross Palmer, Longmont, CO (US); Arthur Ray Roberts, Boulder, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 1627 days.

(21) Appl. No.: 10/039,973

(22) Filed: Oct. 25, 2001

(65) Prior Publication Data

US 2003/0081840 A1    May 1, 2003

(51) Int. Cl.
G06K 9/36    (2006.01)
(52) U.S. Cl. ....................... 382/243; 382/253
(58) Field of Classification Search .................. 382/232, 382/243–239, 251, 253, 173, 181, 209; 341/63, 341/51; 375/240, 240.22, 240.24, 241; 707/101, 707/3
See application file for complete search history.

(56) References Cited

U.S. PATENT DOCUMENTS

| | | | |
|---|---|---|---|
| 4,610,025 A | 9/1986 | Blum et al. | |
| 5,070,532 A | 12/1991 | Faul et al. | |
| 5,247,589 A | 9/1993 | Faul et al. | |
| 5,689,255 A * | 11/1997 | Frazier et al. | ................. 341/63 |
| 5,689,585 A | 11/1997 | Bloomberg et al. | |
| 5,706,364 A | 1/1998 | Kopec et al. | |
| 5,764,807 A * | 6/1998 | Pearlman et al. | ............ 382/240 |
| 5,822,004 A | 10/1998 | Crocitti et al. | |
| 6,075,554 A | 6/2000 | Andrews et al. | |
| 6,081,623 A | 6/2000 | Bloomfield et al. | |
| 6,118,899 A | 9/2000 | Bloomfield et al. | |
| 6,128,406 A | 10/2000 | Ostrovsky | |
| 6,571,016 B1 * | 5/2003 | Mehrotra et al. | ............ 382/236 |
| 6,683,993 B1 * | 1/2004 | Mead | ......................... 382/253 |

* cited by examiner

Primary Examiner—Wenpeng Chen
(74) Attorney, Agent, or Firm—Dale M. Crockatt; Dillon & Yudell LLP

(57) ABSTRACT

A method, system, and computer program product are provided, wherein the bandwidth necessary to transmit an item of image data is reduced. When items of image data are identified in a datastream, they are extracted from the datastream. The image data item is then divided into a series of subregions of variable size. Where efficiency dictates that the operation is appropriate, the subregions are replaced in the image data item with a unique identifier to produce a reduced image. The reduced image is then packaged into a new data structure containing a header, the reduced image, and a decoding table that will allow the replacement of the identifiers with the extracted subregions. Where subregions are repeated, as they frequently are in images of large size, this arrangement will allow for the compression of the image by the elimination of redundant data that merely represents a repeated subregions. When the image reaches its destination, the it is decoded to reproduce the original image.

24 Claims, 6 Drawing Sheets

AUTOMATIC METHOD OF IDENTIFYING IMAGE SUBREGIONS FOR REUSE DURING DATASTREAM TRANSMISSION

BACKGROUND OF THE INVENTION

1. Technical Field

The present invention relates in general to data transmission and in particular to reducing datastream transmission bandwidth. Still more particularly, the present invention relates to reducing the bandwidth consumed in transmission of a datastream by encoding image data within the datastream through a compression algorithm.

2. Description of the Related Art

The revolution in data processing system speed has brought about a corresponding expansion of the types of tasks performed by data processing systems. In the field of image processing, data processing systems now receive, process, and produce all manner of images and image-embedded documents. Many, if not most, of these tasks involve the transmission of images between a data processing system and a peripheral device or another data processing system. Examples of such tasks include the printing of a paper document, the acquisition of a digital image from a digital camera, and the viewing of a web page.

The capacity of interlinks between data processing systems, frequently called available bandwidth, has improved at a substantial pace, and the capacity of interlinks between data processing systems and their peripherals has also improved, although at a frustratingly slow pace. Because of the long process of standardization in peripheral interfaces and protocols for machine interaction, revolutionary improvements in available bandwidth have arrived only very slowly. The traffic across the available bandwidth in many applications, however, has increased at a much faster pace.

Digital cameras provide an excellent example of this phenomenon. The last few years have witnessed a tremendous improvement in the pixel resolution of the images captured by digital cameras, but this revolution in resolution has exponentially increased the size of the image files that must be transported between the camera peripheral and the data processing system that processes the image files. The stagnation in capacity of the available interlinks has created tremendous frustration among users as they wait for images to upload from the digital camera to the data processing system.

Other examples include the increasing reliance on images in ever more sophisticated desktop publishing applications, and the ubiquitous images that have turned the worldwide web from a text-based interface to a complicated multimedia experience. In the case of the worldwide web, it was once predicted that the images embedded in web pages would eventually bring the internet to a standstill. Though the prophets of doom predicted an outcome far more bleak than reality, the frustration of waiting for large images embedded in web pages to download is a disturbingly common experience, especially for users of dial-up modems, which communicate over conventional telephone lines.

With no immediate hope of expanding the bandwidth available for the transmission of image data between data processing systems and between data processing systems and their peripherals, and with the volume of image data transmitted increasing almost daily due to improvements in image acquisition, image processing, and data storage, what is needed is a method of reducing the bandwidth consumed in transmission of a datastream by encoding image data within the datastream through a compression algorithm. Such a method would reduce perceived delay in transmissions and correspondingly reduce the frustration of users who wait impatiently as image content is delivered to their data processing systems, their printers, or their web terminals.

SUMMARY OF THE INVENTION

It is therefore one object of the present invention to improve the efficiency of data transmission.

It is another object of the present invention to reduce datastream transmission bandwidth.

It is yet another object of the present invention to reduce the bandwidth consumed in transmission of a datastream by encoding image data within the datastream through a compression algorithm.

The foregoing objects are achieved as is now described. A method, system, and computer program product are provided, wherein the bandwidth necessary to transmit an item of image data is reduced. When items of image data are identified in a datastream, they are extracted from the datastream. The image data item is then divided into a series of subregions of variable size. Where efficiency dictates that the operation is appropriate, the subregions are replaced in the image data item with a unique identifier to produce a reduced image. The reduced image is then packaged into a new data structure containing a header, the reduced image, and a decoding table that will allow the replacement of the identifiers with the extracted subregions. Where subregions are repeated, as they frequently are in images of large size, this arrangement will allow for the compression of the image by the elimination of redundant data that merely represents a repeated subregion. When the image reaches its destination, the image is decoded to reproduce the original image.

BRIEF DESCRIPTION OF THE DRAWINGS

The above as well as additional objects, features, and advantages of the present invention will become apparent in the following detailed written description.

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
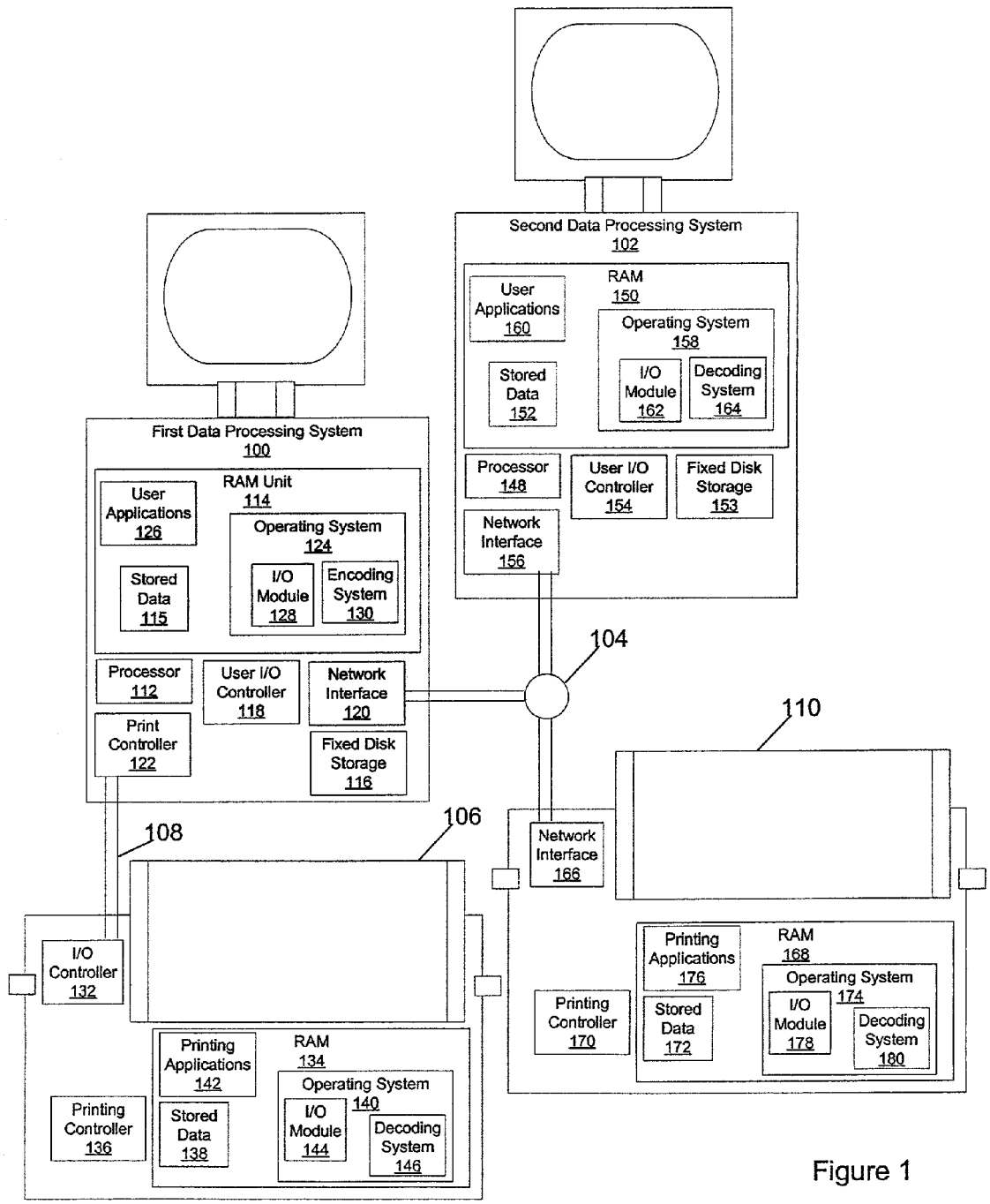
FIG. 1 depicts a representative example of a networked environment, containing multiple data processing systems and peripherals, in which a preferred embodiment of the present invention may be implemented.

With reference now to the figures, and in particular with reference to FIG. 1, a representative example of a networked environment, containing multiple data processing systems and peripherals, in which a preferred embodiment of the present invention may be implemented, is illustrated. The environment contains a first data processing system 100 and a second data processing system 102, which are linked across a network 104. First data processing system 100 is attached to a first display device 106 across a direct inter-system interface 108, such as a cable. An additional display device 110 is also attached to network 104. First display device 106 and additional display device 110 discussed in this exemplary embodiment are printers interacting with both a first data processing system 100 and a second data processing system 102, but the choice of printers and data processing systems is merely exemplary and is not meant to limit the scope of the invention. The present invention applies to any devices that process image data items. These may also include, without limitation, printing systems, data processing systems, personal digital assistants, image reproduction systems, and image display systems of all types. As is shown in the preferred embodiment, linkage across a network 104 is optional and the invention can be practiced and used in an environment where devices connect directly across a direct inter-system interface 108.

First data processing system 100 and second data processing system 102 are represented in a highly simplified manner, and many possible components, which are not critical to understanding the present invention and are familiar to those skilled in the art, are omitted for the sake of clarity. First data processing system 100 contains a processor 112, a RAM unit 114, a fixed disk storage unit 116, a user I/O controller 118, a network interface 120, and a print controller 122.

RAM unit 114 serves as a short term storage location for stored data 115 and instructions as processor 112 operates on stored data 115 and instructions. In the preferred embodiment of the present invention, RAM unit 114 is shown as containing multiple programs and a data structure of stored data 115. The programs include an operating system 124 and a user application 126. Though only those programs are shown in RAM unit 114 of the preferred embodiment, many additional programs, which are omitted for the sake of simplicity and clarity, may also run on first data processing system 100 without departing from the scope or spirit of the present invention. Operating system 124 will typically control program execution, resource allocation, input/output operations, and other functions of first data processing system 100. It exists as a series of modules, only two of which are shown for the sake of simplicity. I/O module 128 controls the instructions sent to user I/O controller 118, network interface 120, and print controller 122. Encoding system 130 controls and performs the image processing functions that form part of the method of reducing datastream transmission bandwidth of the preferred embodiment. The other program shown as stored in RAM unit 114, user application 126, provides a variety of functions that will vary from data processing system to data processing system without impact on the preferred embodiment, though they will often include applications that will generate transmission datastreams, such as print jobs, on which the preferred embodiment will operate.

Other components of first data processing system 100, whose functions have not yet been explained, will typically include a fixed-disk storage unit 116, a user I/O controller 118, a network interface 120 and a print controller 122. Fixed-disk storage unit 116 serves as a long term storage location for data and instructions. User I/O controller 118 provides an interface for most peripheral equipment while network interface 120 provides physical connectivity to network 104 that allows logical connectivity to second data processing system 102 and additional display device 110. Print controller 122 provides physical and logical connectivity to first display device 106 across a direct inter-system interface 108.

First data processing system connects to a first display device 106 across a direct inter-system interface 108, such as a cable. First display device 106 of the preferred embodiment is a printer, but first display device 106 is represented in a highly simplified manner, and many possible components, which are not critical to understanding the present invention and are familiar to those skilled in the art, are omitted for the sake of clarity. The components shown as part of first display device 106 include an I/O controller 132, a RAM unit 134, and a printing controller 136. I/O controller 132 provides physical and logical connectivity to first data processing system 100 across a direct inter-system interface 108.

RAM unit 134 serves as a short term storage location for stored data 138 and instructions as printing controller 136 operates on stored data 138 and instructions in directing the operation of first display device 106. In the preferred embodiment of the present invention, RAM unit 134 is shown as containing multiple programs and a data structure of stored data 138. The programs include an operating system 140 and printing applications 142. Though only those programs are shown in RAM unit 134 of the preferred embodiment, many additional programs, which are omitted for the sake of simplicity and clarity, may also run on first display device 106 without departing from the scope or spirit of the present invention. Operating system 140 will typically control program execution, resource allocation, input/output operations, and other functions of first display device 106. It exists as a series of modules, only two of which are shown for the sake of simplicity. I/O module 144 controls the instructions sent to I/O controller 132 and printing controller 136. Decoding system 146 controls and performs the image processing functions that form part of the method of reducing datastream transmission bandwidth of the preferred embodiment. The other program shown as stored in the RAM unit 134, printing applications 142, provides a variety of functions that will vary from one display device to another without impact on the preferred embodiment, though they will often include applications that will receive transmission datastreams, such as print jobs, on which the preferred embodiment will operate.

Second data processing system 102 is attached to additional display device 110 and to first data processing system 100 across network 104. Second data processing system 102 is represented in a highly simplified manner, and many possible components, which are not critical to understanding the present invention and are familiar to those skilled in the art, are omitted for the sake of clarity. Second data processing system 102 contains a processor 148, a RAM unit 150, a fixed disk storage unit 153, a user I/O controller 154, and a network interface 156.

RAM unit 150 serves as a short term storage location for stored data 152 and instructions as processor 148 operates on stored data 152 and instructions. In the preferred embodiment of the present invention, RAM unit 150 is shown as containing multiple programs and a data structure of stored data 152. The programs include an operating system 158 and a user application 160. Though only those programs are shown in RAM unit 150 of the preferred embodiment, many additional programs which are omitted for the sake of simplicity and clarity may also run on second data processing system 102 without departing from the scope or spirit of the present invention. Operating system 158 will typically control program execution, resource allocation, input/output operations, and other functions of second data processing system 102. It exists as a series of modules, only two of which are shown for the sake of simplicity. I/O module 162 controls the instructions sent to user I/O controller 154 and network interface 156. Decoding system 164 controls and performs the image processing functions that form part of the method of reducing datastream transmission bandwidth of the preferred embodiment. The other program shown as stored in RAM unit 150, user application 160, provides a variety of functions that will vary from data processing system to data processing system without impact on the preferred embodiment, though they will often include applications that will receive transmission datastreams, such as print jobs, on which the preferred embodiment will operate.

Other components of second data processing system 102, whose functions have not yet been explained, will typically include a fixed-disk storage unit 153, a user I/O controller 154 and a network interface 156. Fixed-disk storage unit 153 serves as a long term storage location for data and instructions. User I/O controller 154 provides an interface for most peripheral equipment while network interface 156 provides physical connectivity to network 104 that allows logical connectivity to first data processing system 100.

Second display device 110 connects to first data processing system 100 and second data processing system 102 across network 104. Second display device 110 of the preferred embodiment is a printer, but second display device 110 is represented in a highly simplified manner, and many possible components, which are not critical to understanding the present invention and are familiar to those skilled in the art, are omitted for the sake of clarity. The components shown include a network interface 166, a RAM unit 168, and a printing controller 170.

The RAM unit 168 serves as a short term storage location for stored data 172 and instructions as printing controller 170 operates on stored data 172 and instructions in directing the operation of second display device 110. In the preferred embodiment of the present invention, RAM unit 168 is shown as containing multiple programs and a data structure of stored data 172. The programs include an operating system 174 and printing applications 176. Though only those programs are shown in RAM unit 168 of the preferred embodiment, many additional programs, which are omitted for the sake of simplicity and clarity, may also run on second display device 110 without departing from the scope or spirit of the present invention. Operating system 174 will typically control program execution, resource allocation, input/output operations, and other functions of second display device 110. It exists as a series of modules, only two of which are shown for the sake of simplicity. I/O module 178 controls the instructions sent to network interface 166 and printing controller 170. Decoding system 180 controls and performs the image processing functions that form part of the method of reducing datastream transmission bandwidth of the preferred embodiment. The other program shown as stored in RAM unit 168, printing applications 176, provides a variety of functions that will vary from one display device to another without impact on the preferred embodiment, though they will often include applications that will receive transmission datastreams, such as print jobs, on which the preferred embodiment will operate.

Figure 2:
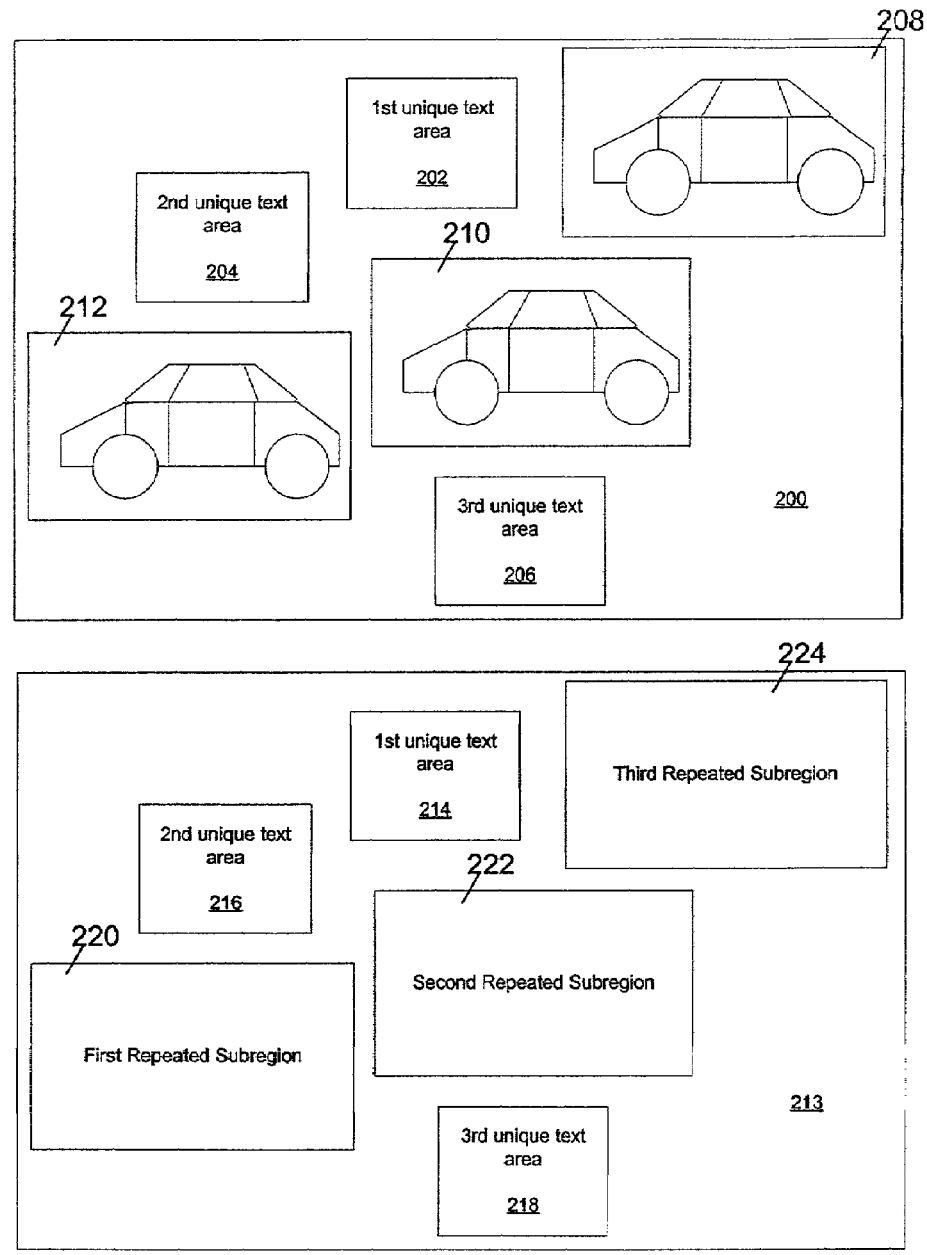
FIG. 2 is a schematic representation of the decoded content of an image data structure in accordance with a preferred embodiment of the present invention.

With reference to FIG. 2, a schematic representation of the decoded content of an image data structure in accordance with a preferred embodiment of the present invention is depicted. An unprocessed image 200, represents the decoded content of an image data structure as it would be displayed to a user of a display system. It contains a first unique text area 202, a second unique text area 204, and a third unique text area 206. It also contains a first repeated image component 208, a second repeated image component 210, and a third repeated image component 212. An image data structure as processed by the preferred embodiment of the present invention 213, shown in the same figure, represents the same decoded content of an image data structure as it would be processed by the preferred embodiment of the present invention. It contains a first unique text area 214, a second unique text area 216, and a third unique text area 218.

Because first unique text area 214, second unique text area 216, and third unique text area 218 are distinct from one another, they do not present an opportunity for compression under the preferred embodiment of the present invention. First repeated image component 208, second repeated image component 210, and third repeated image component 212, however, present an opportunity for compression by the preferred embodiment of the present invention. The preferred embodiment of the present invention will process them as a first repeated subregion 220, a second repeated subregion 222, and a third repeated subregion 224.

In the preferred embodiment of the present invention, rather than transmitting the repeated subregion three times, the transmitting system will identify the repeated subregion, transmit it once, and then substitute an identifier, indicating the proper insertion points for the repeated subregion, into the image data structure that is transmitted. In the process of, or immediately prior to, transmitting a datastream across network 104, encoding system 130 of operating system 124 of first data processing system 100 will examine the datastream to determine if any image data structures are present. Responsive to the determination that an image data structure is present, the encoding system will extract the image data structure from the datastream. It will then divide the image data structure into subregions such as first unique text area 202, second unique text area 204, third unique text area 206, first repeated image component 208, second repeated image component 210, and third repeated image component 212. Seeing that first repeated image component 208, second repeated image component 210, and third repeated image component 212 are redundant in the datastream, encoding system 130 will then store one of these image components as a reference and assign to the selected image component an identifier. In the image data structure itself, first repeated image component 208, second repeated image component 210, and third repeated image component 212 will be replaced with the identifier. The encoding system will then package the image data structure, now containing identifiers rather than the repeated image components into a data structure that is suitable for transmission.

Figure 3:
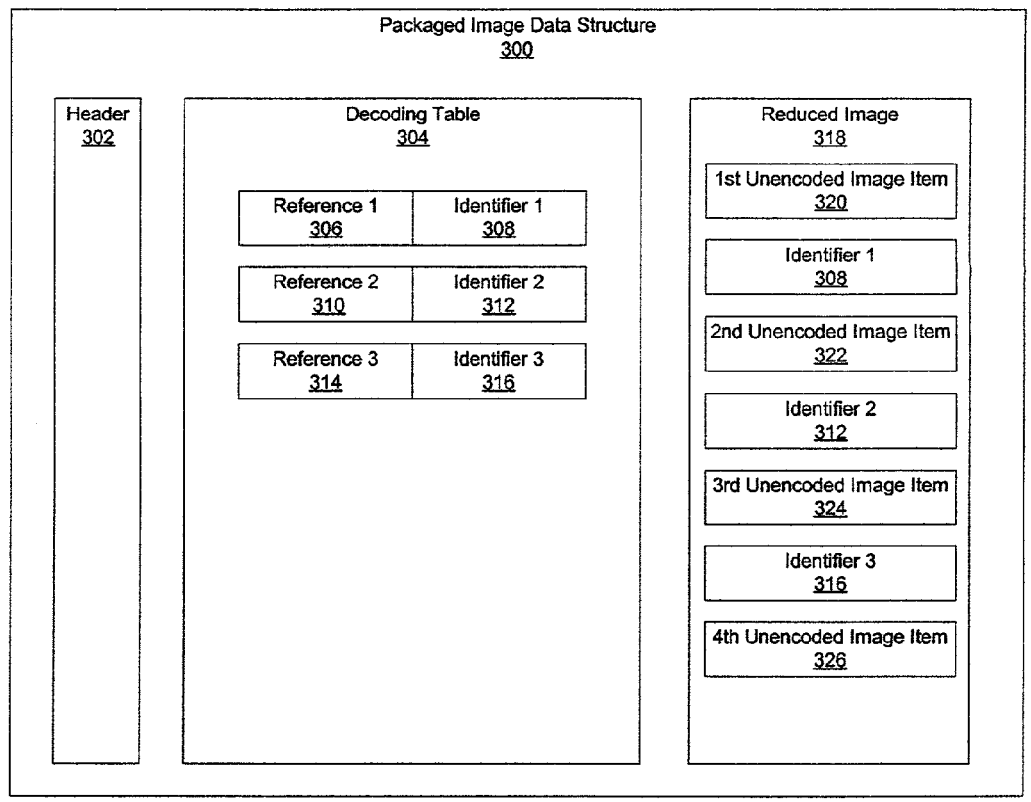
FIG. 3 depicts a simplified representation of a packaged image data structure in accordance with a preferred embodiment of the present invention.

With reference to FIG. 3, a simplified representation of a packaged image data structure in accordance with a preferred embodiment of the present invention is illustrated. This diagram shows a packaged image data structure 300, the result of the process described above, ready for transmission from a transmitting device, such as first data processing system 100, to a receiving device, such as second data processing system 102, first display device 106 or additional display device 110. Packaged image data structure 300 will typically contain a header 302, which will indicate to the receiving device that the data structure received is a packaged image data structure 300 in accordance with the preferred embodiment of the present invention. The header may also contain information that will be useful to the proper decoding of the packaged image data structure, such as the type and version of encoding system 130 that was used to create packaged image data structure 300.

The packaged image data structure 300 will also contain a decoding table 304, which will comprise a series of references and identifiers. In packaged image data structure 300 depicted in FIG. 3, a first reference 306, corresponding to a first identifier 308, a second reference 310, corresponding to a second identifier 312, and a third reference 314, corresponding to a third identifier 316, are shown by way of example. Clearly, the encoding of actual images may include a potentially infinite number of references and identifiers, corresponding to a potentially infinite number of image subregions. The number of subregions that is appropriate for a particular image may be determined by the encoding system through an analysis of the most effective size of a subregion on the basis of any desired system behavior, including transmission efficiency and encoding efficiency.

The packaged image data structure 300 will also contain a reduced image 318. The reduced image will contain the raw data necessary to decode the packaged image, including a series of unencoded image portions and identifiers that will indicate places into which the references should be substituted by decoding system 164 of the receiving device. Reduced image 318 of packaged image data structure 300 shown in FIG. 3 contains a first unencoded image item 320, a first identifier 308, a second unencoded image item 322, a second identifier 312, a third unencoded image item 324, a third identifier 316, and a fourth unencoded image item 326. Clearly, the encoding of actual images may include a potentially infinite number of identifiers and unencoded image items, corresponding to a potentially infinite number of image subregions. The number of subregions that is appropriate for a particular image may be determined by the encoding system through an analysis of the most effective size of a subregion on the basis of any desired system behavior, including transmission efficiency and encoding efficiency.

When packaged image data structure 300 is decoded by the receiving system, reduced image 318 is read, and the appropriate reference is substituted for each identifier. This allows the re-creation of the original image data structure.

Figure 4:
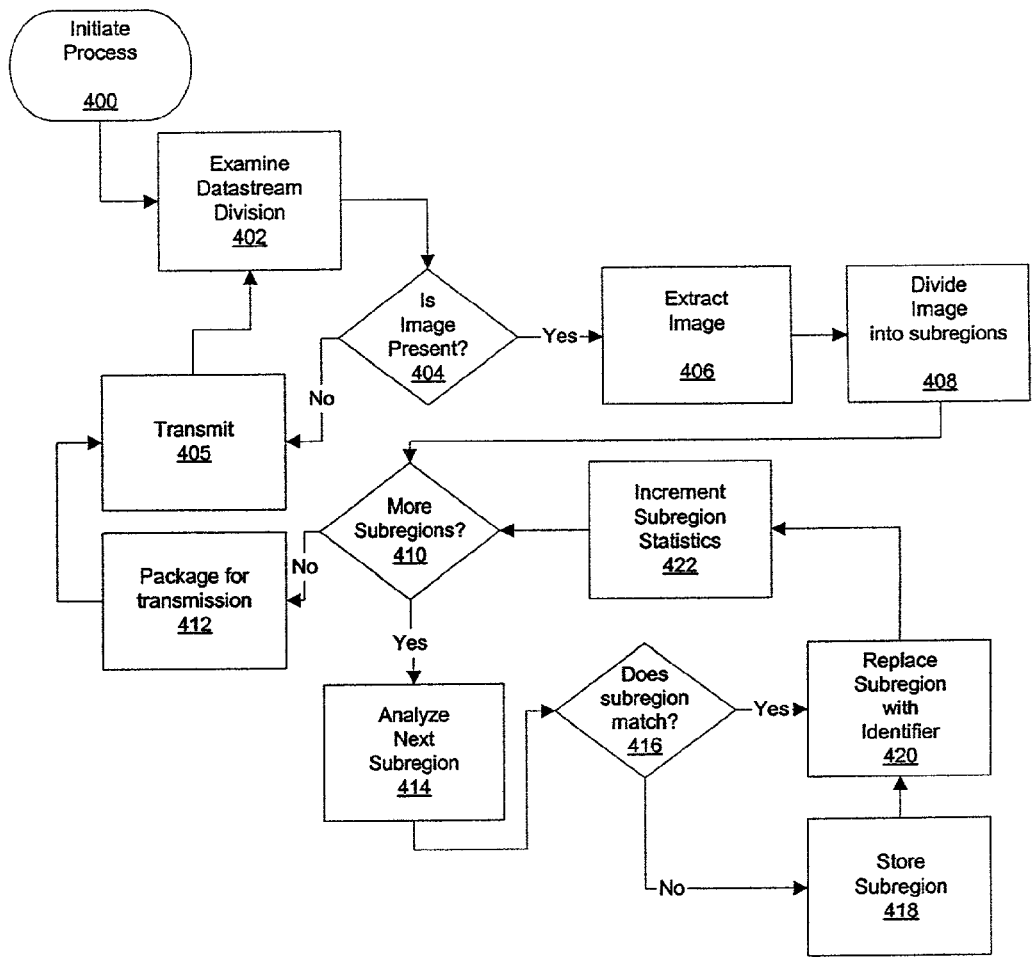
FIG. 4 is a high-level flowchart for a process of encoding an image data structure to reduce the bandwidth consumed in transmission of a datastream by employing a process of encoding image data within the datastream through a compression algorithm in accordance with a preferred embodiment of the present invention.

With reference to FIG. 4, a high-level flowchart for a process of encoding an image data structure to reduce the bandwidth consumed in transmission of a datastream by employing a process of encoding image data within the datastream through a compression algorithm in accordance with a preferred embodiment of the present invention is depicted. The flowchart in FIG. 4 will be explained with reference to first data processing system 100 in FIG. 1. The process begins at step 400, which depicts the initiation of the process. The process will typically be initiated by a signal from I/O module 128, which will, responsive to the preparations to transmit a data stream across print controller 122 or network interface 120, set a flag in RAM unit 114 indicating that encoding system 130 needs to examine a datastream prior to transmission. The process then passes to step 402, which illustrates encoding system 130 ordering processor 112 to examine the datastream or a division of the datastream. The process next passes step 404, which depicts an attempt by encoding system 130 to discover the presence of an image data structure in the datastream. If no image data structure is present in the datastream, the process then passes to step 405, which depicts the datastream being transmitted by I/O module 128 across print controller 122 or network interface 120. The process then returns to step 402, which illustrates encoding system 130 ordering processor 112 to examine the datastream or a division of the datastream.

In step 404, if an image data structure is present in the datastream, the process then passes to step 406, which illustrates encoding system 130 extracting the image data structure from the datastream. The process next passes to step 408, which depicts encoding system 130 dividing the image into subregions. The process then passes to step 410, which illustrates encoding system determining if there are any additional subregions that require examination. If there are no additional subregions that require examination, the process next passes to step 412 which depicts encoding system 130 packaging the image for transmission. Packaging the image for transmission will typically involve the preparation of a packaged image data structure 300, which was described with reference to FIG. 3. After packaged image data structure 300 is prepared, the process then passes to step 405, which depicts the datastream being transmitted by I/O module 128 across print controller 122 or network interface 120.

In step 410, if there are additional subregions that require examination, the process then passes to step 414, which illustrates encoding system 130 analyzing the next subregion of the image. On a first pass through step 408, the preferred embodiment will typically conclude that there are additional subregions to analyze, because there will typically be at least a first subregion. This first subregion will be the "next" subregion analyzed in step 414. As a data structure, the subregion will typically be represented as a binary or hexadecimal series of digits. Analysis of the subregion will consist of a mathematical manipulation of the numerical representation of the subregion, such as the calculation of a checksum or other steps that can be used to increase the efficiency of comparison between two subregions. The process next passes to step 416, which depicts the encoding system comparing the subregion to a stored database of references in the stored data 115 to determine whether the subregion under analysis matches a previously stored reference. The references will be previously identified subregions that are associated with identifiers. The stored database of references can exist in a variety of forms, and multiple sources can contribute to the database of stored references. For instance, as each reference is identified in the analysis of an image according to the process of the preferred embodiment, the references and identifiers for that image can be stored in stored data 115 and can be used as part of the stored database of references. The references and identifiers can also be stored on fixed disk storage 116, and the references can be retained after the analysis of a first image data structure.

The references that are retained after the analysis of a first image data structure can then be retained as a symbol dictionary for use as part of the stored database of references in the analysis of all subsequent image data structures. The encoding system can also perform maintenance on the stored database of references, maintaining statistical counters to detail the frequency with which references in the symbol dictionary are employed and eliminating infrequently used references to save space or caching in RAM unit 114 any frequently used references from the symbol dictionary to save time in the encoding procedure. Frequently used references can also be preloaded on a receiving machine and omitted from decoding table 304 of the packaged image data structure to further enhance transmission efficiency.

In step 416, if the subregion under analysis does not match any of the reference subregions, the process then passes to step 418, which illustrates the subregion under analysis being stored as a reference in stored data 115. An identifier is assigned to the reference at this time. The process next passes to step 420, which depicts the encoding system substituting the previously mentioned identifier for the numerical representation of the subregion in the image data structure. Multiple iterations of this process eventually produce reduced image 318. In step 416, if the subregion under analysis does match one of the reference subregions, the process then passes to step 420, which depicts the encoding system substituting the previously mentioned identifier for the numerical representation of the subregion in the image data structure. The process then passes to step 422, which illustrates the encoding system updating statistical counters to detail the frequency with which references in the symbol dictionary are employed and eliminating infrequently used references to save space or caching in RAM unit 114 any frequently used references from the symbol dictionary to save time in the encoding procedure. The process then returns to step 410.

Figure 5:
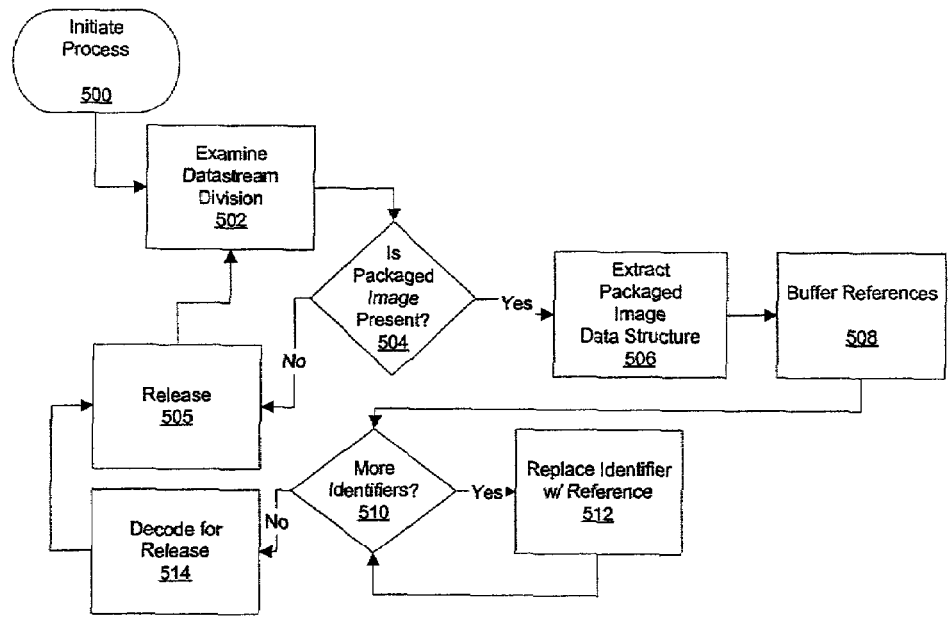
FIG. 5 depicts a high-level flowchart for a process of decoding a packaged image data structure to reduce the bandwidth consumed in transmission of a datastream by employing a process of encoding image data within the datastream through a compression algorithm in accordance with a preferred embodiment of the present.

With reference to FIG. 5, a high-level flowchart for a process of decoding a packaged image data structure to reduce the bandwidth consumed in transmission of a datastream by employing a process of encoding image data within the datastream through a compression algorithm in accordance with a preferred embodiment of the present invention is illustrated.

The flowchart in FIG. 5 will be explained with reference to first display device 106 in FIG. 1, though it could be explained as easily with reference to second data processing system 102 or additional display device 110. The process begins at step 500, which depicts the initiation of the process. The process will typically be initiated by a signal from I/O module 144, which will, responsive to the receipt of a data stream across I/O controller 132, set a flag in RAM unit 134 indicating that decoding system 146 needs to examine a datastream that was received. The process then passes to step 502, which illustrates decoding system 146 ordering printing controller 136 to examine the datastream or a division of the datastream. The process next passes step 504, which depicts an attempt by decoding system 146 to discover the presence of a packaged image data structure in the datastream. If no packaged image data structure is present in the datastream, the process then passes to 505, which depicts the datastream being released by I/O module 144 to printing applications 142. The process then returns to step 502, which illustrates decoding system 146 ordering printing controller 136 to examine the datastream or a division of the datastream.

In step 504, if a packaged image data structure is present in the datastream, the process then passes to step 506, which illustrates decoding system 146 extracting the packaged image data structure from the datastream. The process next passes to step 508, which depicts decoding system 146 placing the references and identifiers from decoding table 304 into buffers in stored data 138 to create a stored database of references and identifiers. The references will be previously identified subregions that are associated with identifiers. The stored database of references can exist in a variety of forms, and multiple sources can contribute to the database of stored references. For instance, as each reference is identified in the previously described analysis of an image according to the process of the preferred embodiment, the references and identifiers for that image will typically be stored in decoding table 304 that is transmitted as a part of packaged image data structure 300. These references and identifiers will typically be used as part of the stored database of references. The references and identifiers can also be retained after the analysis of a packaged image data structure and be stored for use in the analysis of later image data structures.

The references that are retained after the analysis of a first image data structure can be retained as a symbol dictionary for use as part of the stored database of references in the analysis of all subsequent image data structures. This will typically be accomplished by means of a signal in the packaged image data structure indicating that certain reference and identifier pairs are to be retained after the processing of the image in which they are used. The encoding system can also remotely perform maintenance on the stored database of references, maintaining statistical counters to detail the frequency with which references in the symbol dictionary are employed and sending signals to eliminate infrequently used references to save space. Frequently used references can also be preloaded on a receiving machine and omitted from decoding table 304 of the packaged image data structure to further enhance transmission efficiency.

The process then passes to step 510, which illustrates the decoding system determining if there are any additional identifiers present in reduced image 318. If there are additional identifiers, the process next passes to step 512, which depicts decoding system 146 replacing the identifiers in the reduced image with the references in stored data 138 to reproduce the original image. The process then returns to step 510, completing an iterative loop wherein the system replaces identifiers with references until all of the identifiers have been replaced.

In step 510, if there are no additional identifiers, the process then passes to step 514, which illustrates decoding system 146 decoding the image. This will involve preparing the image data structure in a format that the other software modules operating on the display device can employ in other processes. The process then returns to step 505.

Figure 6:
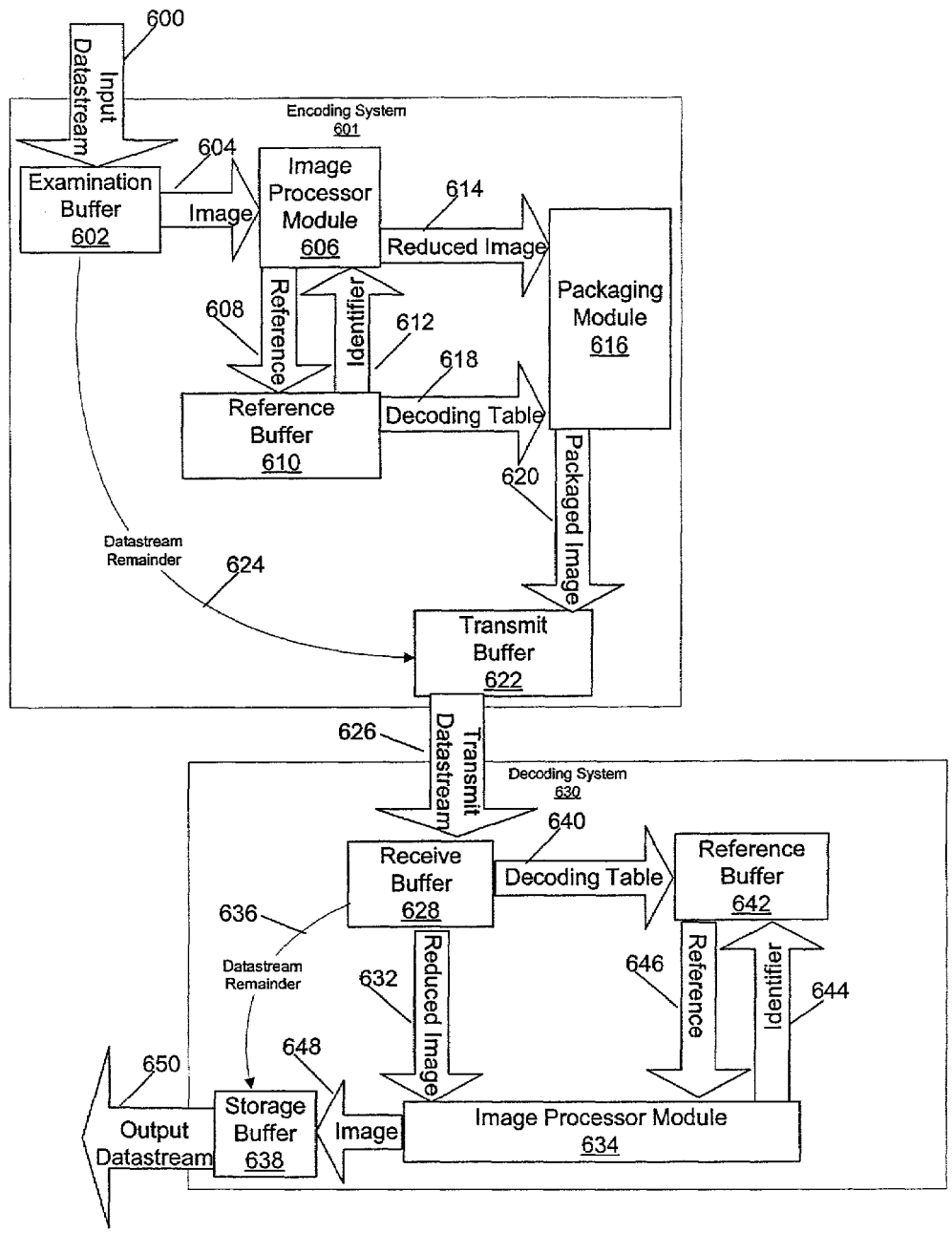
FIG. 6 is a module diagram representing message flow between the various software modules in a process of encoding image data within a datastream through a compression algorithm in accordance with the preferred embodiment of the present invention.

With reference to FIG. 6, a module diagram representing message flow between the various software modules in a process of encoding image data within the datastream through a compression algorithm in accordance with the preferred embodiment of the present invention is depicted. The diagram depicts the flow of information between the encoding module, present on the sending system, and the decoding module, present on the receiving system. It also illustrates the intra-module traffic of messages between the various components of the encoding system and the decoding system, as they appear when the system is studied at the application level. The message flow in FIG. 6 will be explained with reference to encoding on first data processing system 100 and to decoding on second data processing system 102 in FIG. 1, though it could be explained as easily with reference to first display device 106 or additional display device 110. The message flow begins at process initiation in step 400, when an input datastream 600 is received from I/O module 128 in operating system 124 of first data processing system 100. This input datastream flows into an examination buffer 602 within encoding system 601. I/O module 128 will simultaneously, responsive to the preparations to transmit a data stream across print controller 122 or network interface 120, set a flag in RAM unit 114 indicating that encoding system 130 needs to examine datastream 600 that is stored in examination buffer 602.

Next, after encoding system 130 orders processor 112 to examine the datastream or a division of the datastream in step 402, if encoding system 130 discovers the presence of an image data structure in the datastream in step 404, encoding system 130 will extract the image data structure from the datastream in step 406 and transfer image 604 from examination buffer 602 to image processor module 606. Encoding system 130 divides the image into subregions in step 408, analyzes the subregions in step 414, compares the subregions to references in step 416, and, where it is discovered that a subregion does not match any previous references, an analyzed subregion is prepared as a reference 608, which is passed to a reference buffer 610 in step 418. Reference buffer 610 responds by assigning an identifier 612 to the reference and sending identifier 612 to image processor 5 module 606, where the image processor module replaces the subregion with the identifier in step 420. The image processor module also maintains the subregion statistics in step 422. When all appropriate subregions have been replaced with references and step 410 indicates that there are no further subregions that require analysis, the image processor module sends reduced image 614 to packaging module 616 in step 412. Simultaneously, reference buffer 610 sends decoding table 618 to packaging module 616. Packaging module 616 then generates a header 302 and creates a packaged image data structure 300 by combining decoding table 618, header 302, and reduced image 614. Packaged image data structure 620 is then sent to a transmit buffer 622, where it is re-combined with datastream remainder 624, which was sent to transmit buffer 622 by examination buffer 602. Datastream remainder 624 comprises all information in the datastream other than image data structures that are the subject of the preferred embodiment.

The transmit datastream 626 is then sent by the transmit buffer to I/O module 128 in step 405. It travels across network interface 120 of first data processing system 100, across network 104, and across network interface 156 of second data processing system 102, to reach I/O module 162 in operating system 158 of second data processing system 102. I/O module 162 in operating system 158 of second data processing system 102 then passes transmit datastream 626 to receive buffer 628 in decoding system 630, initiating the decoding process in step 500.

The receive buffer 628 in decoding system 630 then examines the datastream or a division of it in step 502. In step 504, if a packaged image data structure is present in the datastream, the receive buffer extracts the extracts the image data structure from the datastream in step 506. This consists of sending reduced image 632 to image processor module 634 and sending datastream remainder 636 to a storage buffer 638. Datastream remainder 636 comprises all information in the datastream other than image data structures that are the subject of the preferred embodiment. Decoding table 640 is then sent to reference buffer 642 and the references are stored in the reference buffer in step 508.

If, in step 510, image processor module 634 determines that there are identifiers present in reduced image 632, image processor module 634 replaces the identifiers in the reduced image with the references in stored data 138 to reproduce the original image in step 512. This is accomplished by image processor module 634 sending identifiers 644 from reduced image 632 to reference buffer 642 and reference buffer 642 replying to image processor module 634 by sending corresponding references 646 to image processor module 634. Image processor module 634 then replaces identifiers 644 with references 646 in step 512.

After the image data structure is completely reassembled by image processor module 634 in step 514, image data structure 648 is then transmitted to storage buffer 638, where it is recombined with datastream remainder 636 and released as an output datastream 650 to I/O module 162 in step 505.

Although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method for reducing datastream transmission bandwidth requirements, comprising:

in response to determining that an image data structure is present in a datastream, wherein the image data structure contains data of an image;

extracting said image data structure from said datastream;

dividing said image data structure into one or more subregions;

associating a corresponding identifier with a first selected one of said one or more subregions;

in response to determining that said first selected one of said one or more subregions is substantially identical to a second selected one of said one or more subregions, replacing second selected one of said one or more subregions with said corresponding identifier of said first selected one of said one or more subregions;

reducing transmission bandwidth requirements by generating a packaged image, which includes a decoding table comprising said first selected one or more subregions and said corresponding identifier of said first selected one of said one or more subregions in place of said second selected one of said one or more subregions, wherein the decoding table contains all identifiers needed for decoding the data stream; and inserting said packaged image into said data stream; and transmitting said modified data stream.

2. The method of claim 1, wherein the dividing step further comprises analyzing an image to determine the most effective size of a subregion.

3. The method of claim 1, wherein the reducing transmission bandwidth requirements by generating step further comprises retaining a symbol dictionary of references and identifiers employed in the determining step of processing a previously analyzed image data structure.

4. The method of claim 3, wherein the retaining step further comprises maintaining descriptive statistics on the frequency with which references stored in the symbol dictionary are employed and selectively removing the references when the frequency of their occurrence falls.

5. The method of claim 1, wherein the reducing transmission bandwidth requirements by generating step further comprises storing a preloaded set of references on a sending machine and omitting preloaded references from the decoding table.

6. A method for decoding a packaged image, comprising:

determining whether a packaged image is present in a datastream;

responsive to determining that a packaged image is present in a datastream, extracting the packaged image;

separating the packaged image into an image data structure and a decoding table containing one or more references and one or more corresponding identifiers, wherein the decoding table contains all identifiers needed for decoding the data stream; and modifying the image data structure to replace any identifiers present in the image data structure with corresponding references, wherein the references represent subregions of at least one image.

7. The method of claim 6, wherein the modifying step further comprises replacing identifiers with references from a preloaded decoding table.

8. A method for reducing datastream transmission bandwidth, comprising:
   examining a datastream for the presence of one or more image data items, wherein the one or more image data items contains data of an image;
   responsive to the presence of one or more image data items, examining the one or more image data items for the presence of one or more repeated visual data elements;
   responsive to the presence of one or more repeated visual data elements, recoding the datastream to include one or more replacement markers inserted to replace the one or more repeated visual data elements and a decoding table for translating the one or more replacement markers during decoding, wherein the decoding table contains all identifiers needed for decoding the data stream.

9. An apparatus for reducing datastream transmission bandwidth requirements, comprising:
   means for, in response to determining that an image data structure is present in a datastream, wherein the image data structure contains data of an image;
   means for extracting said image data structure from said datastream;
   means for dividing said image data structure into one or more subregions;
   means for associating a corresponding identifier with a first selected one of said one or more subregions;
   means, in response to determining that said first selected one of said one or more subregions is substantially identical to a second selected one of said one or more subregions,
   means for replacing second selected one of said one or more subregions with said corresponding identifier of said first selected one of said one or more subregions;
   means for reducing transmission bandwidth requirements by generating a packaged image, which includes a decoding table comprising said first selected one or more subregions and said corresponding identifier of said first selected one of said one or more subregions in place of said second selected one of said one or more subregions, wherein the decoding table contains all identifiers needed for decoding the data stream; and
   inserting said packaged image into said data stream; and
   means for transmitting said modified data.

10. The apparatus of claim 9, wherein the dividing means further comprises means for analyzing an image to determine the most effective size of a subregion.

11. The apparatus of claim 9, wherein the reducing transmission bandwidth requirements by generating means further comprises means for retaining a symbol dictionary of references and identifiers employed by the determining means in processing a previously analyzed image data structure.

12. The apparatus of claim 11, wherein the retaining means further comprises means for maintaining descriptive statistics on the frequency with which references stored in the symbol dictionary are employed and selectively removing the references when the frequency of their occurrence falls.

13. The apparatus of claim 9, wherein the reducing transmission bandwidth requirements by generating means further comprises means for storing a preloaded set of references on a sending machine and omitting preloaded references from the decoding table.

14. An apparatus for decoding a packaged image, comprising:
   means for determining whether a packaged image is present in a datastream;
   means for, responsive to determining that a packaged image is present in a datastream, extracting the packaged image;
   means for separating the packaged image into an image data structure and a decoding table containing one or more references and one or more corresponding identifiers, wherein the decoding table contains all identifiers needed for decoding the data stream; and
   means for modifying the image data structure to replace any identifiers present in the image data structure with corresponding references, wherein the references represent subregions of at least one image.

15. The apparatus of claim 14, wherein the modifying means further comprises means for replacing identifiers with references from a preloaded decoding table.

16. An apparatus for reducing datastream transmission bandwidth, comprising:
   means for examining a datastream for the presence of one or more image data items, wherein the one or more image data items contains data of an image;
   means for, responsive to the presence of one or more image data items, examining the one or more image data items for the presence of one or more repeated visual data elements;
   means for, responsive to the presence of one or more repeated visual data elements, recoding the datastream to include one or more replacement markers inserted to replace the one or more repeated visual data elements and a decoding table for translating the one or more replacement markers during decoding, wherein the decoding table contains all identifiers needed for decoding the data stream.

17. A computer program product in a computer usable medium for reducing datastream transmission bandwidth requirements, comprising:
   a computer usable medium, wherein the medium is a computer hardware storage medium;
   instructions on the computer usable medium for,
   instructions on the computer usable medium for, in response to determining that an image data structure is present in a datastream, wherein the image data structure contains data of an image;
   instructions on the computer usable medium for extracting said image data structure from said datastream;
   instructions on the computer usable medium for dividing said image data structure into one or more subregions;
   instructions on the computer usable medium for associating a corresponding identifier with a first selected one of said one or more subregions;
   instructions on the computer usable medium for, in response to determining that said first selected one of said one or more subregions is substantially identical to a second selected one of said one or more subregions,
   instructions on the computer usable medium for replacing second selected one of said one or more subregions with said corresponding identifier of said first selected one of said one or more subregions;
   instructions on the computer usable medium for reducing transmission bandwidth requirements by generating a packaged image, which includes a decoding table comprising said first selected one or more subregions and said corresponding identifier of said first selected one of said one or more subregions in place of said second selected one of said one or more subregions, wherein the decoding table contains all identifiers needed for decoding the data stream; and inserting said packaged image into said data stream.

18. The computer program product of claim 17, wherein the instructions for dividing further comprise instructions on the computer usable medium for analyzing an image to determine the most effective size of a subregion.

19. The computer program product of claim 17, wherein the instructions for reducing transmission bandwidth requirements by generating a packaged image further comprise instructions on the computer usable medium for retaining a symbol dictionary of references and identifiers employed in the determining step of processing a previously analyzed image data structure.

20. The computer program product of claim 19, wherein the instructions for retaining further comprise instructions on the computer usable medium for maintaining descriptive statistics on the frequency with which references stored in the symbol dictionary are employed and selectively removing the references when the frequency of their occurrence falls.

21. The computer program product of claim 17, wherein the instructions for reducing transmission bandwidth requirements by generating a packaged image further comprise instructions on the computer usable medium for storing a preloaded set of references on a sending machine and omitting preloaded references from the decoding table.

22. A computer program product in a computer usable medium for decoding a packaged image, comprising:

a computer usable medium, wherein the medium is a computer hardware storage medium;

instructions on the computer usable medium for determining whether a packaged image is present in a datastream;

instructions on the computer usable medium for, responsive to determining that a packaged image is present in a datastream, extracting the packaged image;

instructions on the computer usable medium for separating the packaged image into an image data structure and a decoding table containing one or more references and one or more corresponding identifiers, wherein the decoding table contains all identifiers needed for decoding the data stream; and instructions on the computer usable medium for modifying the image data structure to replace any identifiers present in the image data structure with corresponding references, wherein the references represent subregions of at least one image.

23. The computer program product of claim 22, wherein the instructions for modifying further comprise instructions on the computer usable medium for replacing identifiers with references from a preloaded decoding table.

24. A computer program product in a computer usable medium for reducing datastream transmission bandwidth, comprising:

a computer usable medium, wherein the medium is a computer hardware storage medium;

instructions on the computer usable medium for examining a datastream for the presence of one or more image data items, wherein the one or more image data items contains data of an image;

instructions on the computer usable medium for, responsive to the presence of one or more image data items, examining the one or more image data items for the presence of one or more repeated visual data elements; and instructions on the computer usable medium for responsive to the presence of one or more repeated visual data elements, recoding the datastream to include one or more replacement markers inserted to replace the one or more repeated visual data elements and a decoding table for translating the one or more replacement markers during decoding, wherein the decoding table contains all identifiers needed for decoding the data stream.

* * * * *